United States Patent
Chang et al.

(10) Patent No.: US 11,575,815 B2
(45) Date of Patent: Feb. 7, 2023

(54) DRIVING MODULE, CAMERA MODULE AND ELECTRONIC DEVICE

(71) Applicant: LARGAN DIGITAL CO., LTD., Taichung (TW)

(72) Inventors: Lin-An Chang, Taichung (TW); Ming-Ta Chou, Taichung (TW); Chen-Yi Huang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 17/386,666

(22) Filed: Jul. 28, 2021

(65) Prior Publication Data

US 2022/0046154 A1 Feb. 10, 2022

Related U.S. Application Data

(60) Provisional application No. 63/062,572, filed on Aug. 7, 2020.

(51) Int. Cl.
*H04N 5/225* (2006.01)

(52) U.S. Cl.
CPC ......... *H04N 5/2257* (2013.01); *H04N 5/2253* (2013.01); *H04N 5/2254* (2013.01)

(58) Field of Classification Search
CPC .. H04N 5/2253; H04N 5/2254; H04N 5/2257; H04N 5/23287
See application file for complete search history.

(56) References Cited

U.S. PATENT DOCUMENTS

| | | | |
|---|---|---|---|
| 3,818,181 A | 6/1974 | Benard et al. | |
| 9,319,574 B2 | 4/2016 | Shin et al. | |
| 9,420,183 B2 | 8/2016 | Hwang et al. | |
| 9,578,242 B2* | 2/2017 | Kang | G02B 27/646 |
| 9,618,770 B2 | 4/2017 | Park et al. | |
| 10,310,290 B2 | 6/2019 | Yu et al. | |
| 10,386,651 B2 | 8/2019 | Kim et al. | |
| 10,422,974 B2 | 9/2019 | Kim et al. | |
| 10,444,530 B2 | 10/2019 | Park et al. | |
| 2015/0296143 A1* | 10/2015 | Kang | G03B 17/12 348/208.11 |
| 2020/0004110 A1* | 1/2020 | Park | H04N 5/238 |

(Continued)

FOREIGN PATENT DOCUMENTS

| | | |
|---|---|---|
| CN | 103869445 B | 6/2014 |
| CN | 104950419 B | 9/2015 |

*Primary Examiner* — Amy R Hsu
(74) *Attorney, Agent, or Firm* — McClure, Qualey & Rodack, LLP

(57) ABSTRACT

A driving module includes a base, a first shiftable plate, a second shiftable plate and a carrier. A plurality of first rolling members are disposed between the first shiftable plate and the carrier, so that the first shiftable plate is movable relative to the base along a first direction. A plurality of second rolling members are disposed between the second shiftable plate and the first shiftable plate, so that the second shiftable plate is movable relative to the first shiftable plate along a second direction, and the second direction is orthogonal to the first direction. A plurality of third rolling members are disposed between the carrier and the second shiftable plate, so that the carrier is movable relative to the second shiftable plate along a third direction, and the third direction is orthogonal to the first direction and the second direction.

16 Claims, 14 Drawing Sheets

(56) References Cited

U.S. PATENT DOCUMENTS

2020/0124945 A1\* 4/2020 Kim .................. H04N 5/2254
2020/0166771 A1 5/2020 Huang et al.
2020/0341228 A1\* 10/2020 Wu .................. H04N 5/2254

\* cited by examiner

DRIVING MODULE, CAMERA MODULE AND ELECTRONIC DEVICE

RELATED APPLICATIONS

This application claims priority to Provisional Application Ser. No. 63/062,572, filed Aug. 7, 2020, which is herein incorporated by reference.

BACKGROUND

Technical Field

The present disclosure relates to a driving module and a camera module. More particularly, the present disclosure relates to a driving module and a camera module applicable to a portable electronic device.

Description of Related Art

In recent years, portable electronic devices have developed rapidly. For example, intelligent electronic devices and tablets have been filled in the lives of modern people, and camera modules mounted on portable electronic devices and driving modules thereof have also prospered. However, as technology advances, the quality requirements of driving modules are becoming higher and higher. Therefore, developing a driving module of which a stability of the movement can be improved becomes an important and solving problem in industry.

SUMMARY

According to one aspect of the present disclosure, a driving module includes a base, a first shiftable plate, a second shiftable plate and a carrier. A plurality of first rolling members are disposed between the first shiftable plate and the carrier, so that the first shiftable plate is movable relative to the base along a first direction. A plurality of second rolling members are disposed between the second shiftable plate and the first shiftable plate, so that the second shiftable plate is movable relative to the first shiftable plate along a second direction, and the second direction is orthogonal to the first direction. A plurality of third rolling members are disposed between the carrier and the second shiftable plate, so that the carrier is movable relative to the second shiftable plate along a third direction, and the third direction is orthogonal to the first direction and the second direction. Each of the carrier, the first shiftable plate and the second shiftable plate has an opening, and all of the openings are towards the third direction.

According to another aspect of the present disclosure, a camera module includes a driving module, an imaging lens element set and an image sensor. The driving module includes a base, a first shiftable plate, a second shiftable plate and a carrier. A plurality of first rolling members are disposed between the first shiftable plate and the base, so that the first shiftable plate is movable relative to the base along a first direction. A plurality of second rolling members are disposed between the second shiftable plate and the first shiftable plate, so that the second shiftable plate is movable relative to the first shiftable plate along a second direction, and the second direction is orthogonal to the first direction. A plurality of third rolling members are disposed between the carrier and the second shiftable plate, so that the carrier is movable relative to the second shiftable plate along a third direction, and the third direction is orthogonal to the first direction and the second direction. The imaging lens element set is disposed in the carrier and has an optical axis, wherein the optical axis is parallel to the third direction. The image sensor is for converting a light passing through the imaging lens element set into an image signal.

According to another aspect of the present disclosure, an electronic device includes the aforementioned camera module.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
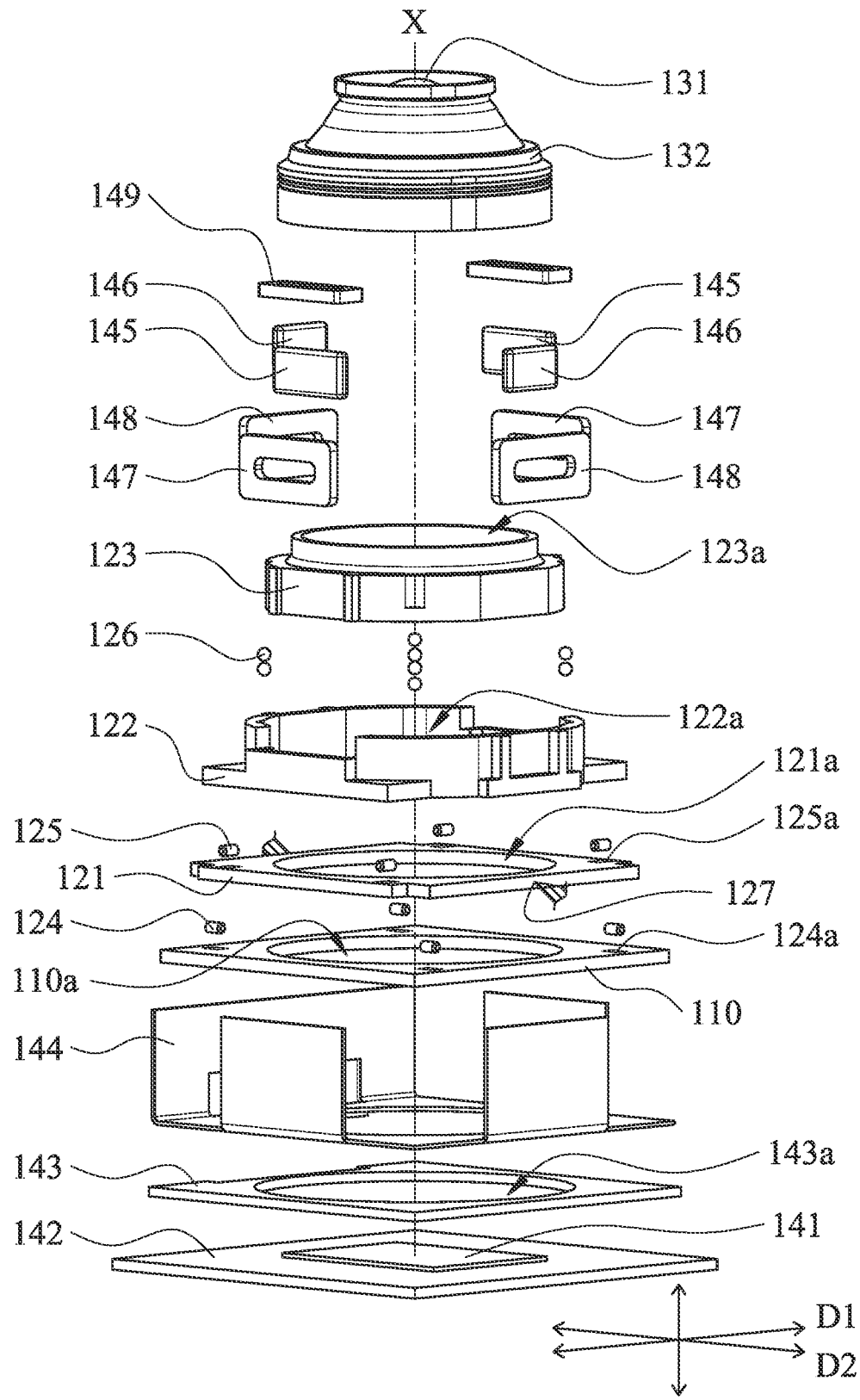
FIG. 1A is an exploded view of a camera module according to the 1st embodiment of the present disclosure.

The present disclosure provides a driving module, which includes a base, a first shiftable plate, a second shiftable plate and a carrier. A plurality of first rolling members are disposed between the first shiftable plate and the carrier, so that the first shiftable plate is movable relative to the base along a first direction. A plurality of second rolling members are disposed between the second shiftable plate and the first shiftable plate, so that the second shiftable plate is movable relative to the first shiftable plate along a second direction, and the second direction is orthogonal to the first direction. A plurality of third rolling members are disposed between the carrier and the second shiftable plate, so that the carrier is movable relative to the second shiftable plate along a third direction, and the third direction is orthogonal to the first direction and the second direction. Each of the carrier, the first shiftable plate and the second shiftable plate has an opening, and all of the openings are towards the third direction. Therefore, the present disclosure provides the driving module which is shiftable in three axes via the configuration of the first shiftable plate, the second shiftable plate, the first rolling members, the second rolling members and the third rolling members, so that the stability of the movement can be improved and miniaturization can be achieved.

The first rolling members and the second rolling members can be cylinders. Therefore, all of the first rolling members and the second rolling members can be rolled in the form of rollers, a degree of freedom in one direction can be provided, and a complexity of the structure is decreased.

The first rolling members can extend along the second direction, and the second rolling members can extend along the first direction. Specifically, an extending direction of the first rolling members and an extending direction of the second rolling members are perpendicular to each other so that the utilization in the space can be more efficient.

Each of a number of the first rolling members and a number of the second rolling members can be at least two. Therefore, the driving module can be prevented from tilting so as to enhance the stability of shifting.

A number of the third rolling members is at least four, and the third rolling members are symmetrically disposed around a center of the opening of the carrier. Furthermore, the third rolling members can be balls or cylinders, but the present disclosure is not limited thereto. Therefore, a supporting force can be provided for the axial movement without disposing a spring leaf or a magnetic yoke.

The driving module can further include a plurality of first grooves, wherein the first grooves are disposed between the base and the first shiftable plate, and the first rolling members are disposed in the first grooves. Therefore, a process of assembling can be simplified, and reliability of products can be enhanced.

The driving module can further include a plurality of second grooves, wherein the second grooves are disposed between the first shiftable plate and the second shiftable plate, and the second rolling members are disposed in the second grooves. Therefore, a process of assembling can be simplified, and reliability of products can be enhanced.

The driving module can further include a plurality of third grooves, wherein the third grooves are disposed between the second shiftable plate and the carrier, and the third rolling members are disposed in the third grooves. Therefore, a shock resistance of the driving module can be improved, and the third rolling members can be prevented from detaching.

Both of the first shiftable plate and the second shiftable plate are made of plastic material and formed by injection molding. Therefore, a higher size accuracy and manufacturing productivity can be provided.

At least one of the first shiftable plate and the second shiftable plate includes at least two gate traces. Therefore, a forming efficiency can be improved, and a forming tolerance can be decreased.

At least one of the opening of the first shiftable plate and the opening of the second shiftable plate can include a plurality of strip-shaped wedge structures. Therefore, a possibility of generating non-imaging light can be decreased.

The driving module can further include a first magnet and a second magnet, wherein a polarization direction of the first magnet and a polarization direction of the second magnet can be different. Therefore, a configuration of a multi-axial driving magnetic circuit can be provided.

The driving module can further include a first optical image stabilizing coil and a second optical image stabilizing coil. The first optical image stabilizing coil and the second optical image stabilizing coil are corresponding to the first magnet and the second magnet, respectively. Therefore, two horizontal driving forces can be provided respectively so as to achieve optical image stabilization in two dimensions.

The driving module can further include an auto-focusing coil, wherein the auto-focusing coil is corresponding to one of the first magnet and the second magnet. Therefore, an axial driving force can be provided so as to achieve the function of auto-focusing.

It is worth to be mentioned that the first optical image stabilizing coil or the second optical image stabilizing coil can share the first magnet or the second magnet with the auto-focusing coil. Hence, an electromagnetic driving form of the first optical image stabilizing coil corresponding to the first magnet and an electromagnetic driving form of the second optical image stabilizing coil corresponding to the second magnet are slightly different. Furthermore, in the condition that a height of the first optical image stabilizing coil and a height of the second optical image stabilizing coil are different along a direction of an optical axis, thus the condition that the first optical image stabilizing coil or the second optical image stabilizing coil share the first magnet or the second magnet with the auto-focusing coil, can be satisfied, but the present disclosure is not limited thereto. Moreover, a height of the first magnet along the optical axis and a height of the second magnet along the optical axis can be different. A space usage of the driving module and a number of elements can be decreased via a configuration of the shared first magnet or second magnet.

When a distance between a center of the opening of the carrier and a center of each of the first rolling members is Dr1, a distance between the center of the opening of the carrier and a center of each of the second rolling members is Dr2, and a distance between the center of the opening of the carrier and a center of each of the third rolling members is Dr3, the following condition is satisfied: $Dr3 < (Dr1+Dr2)/2$. Therefore, compactness of structures can be improved and an unbalanced force can be avoided during an axial movement.

Each of the abovementioned features of the driving module can be utilized in various combinations for achieving the corresponding effects.

The present disclosure provides a camera module, which includes a driving module, an imaging lens element set and an image sensor. The driving module includes a base, a first shiftable plate, a second shiftable plate and a carrier. A plurality of first rolling members are disposed between the first shiftable plate and the base, so that the first shiftable plate is movable relative to the base along a first direction. A plurality of second rolling members are disposed between the second shiftable plate and the first shiftable plate, so that the second shiftable plate is movable relative to the first shiftable plate along a second direction, and the second direction is orthogonal to the first direction. A plurality of third rolling members are disposed between the carrier and the second shiftable plate, so that the carrier is movable relative to the second shiftable plate along a third direction, and the third direction is orthogonal to the first direction and the second direction. The imaging lens element set is disposed in the carrier and has an optical axis, wherein the optical axis is parallel to the third direction. The image sensor is for converting a light passing through the imaging lens element set into an image signal. Therefore, the present disclosure provides the camera module with auto-focusing and optical image stabilization. Via the configuration of the first shiftable plate, the second shiftable plate, the first rolling members, the second rolling members and the third rolling members, the stability of the movement can be improved and miniaturization can be achieved.

The present disclosure provides an electronic device, which includes the aforementioned camera module.

Figure 1B:
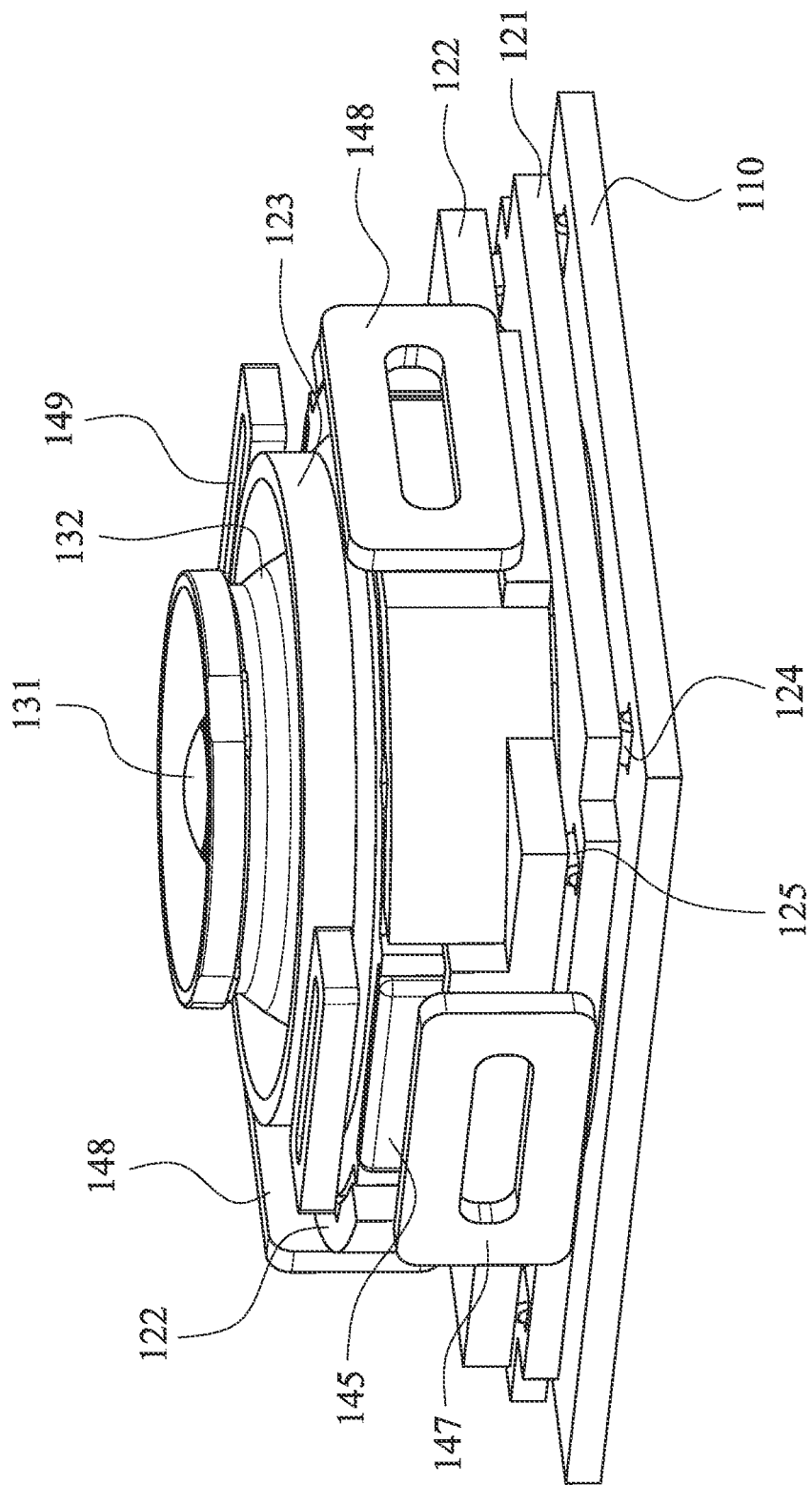
FIG. 1B is an assembling three-dimensional view of a driving module and an imaging lens element set according to the 1st embodiment in FIG. 1A.

According to the aforementioned embodiment, specific examples are provided, and illustrated via figures 1st Embodiment FIG. 1A is an exploded view of a camera module 100 according to the 1st embodiment of the present disclosure, and FIG. 1B is an assembling three-dimensional view of a driving module and an imaging lens element set according to the 1st embodiment in FIG. 1A. In FIG. 1A and FIG. 1B, the camera module 100 includes a driving module (its reference numeral is omitted), an imaging lens element set 131 and an image sensor 141. Furthermore, according to the 1st embodiment, the camera module 100 from an object side to an image side includes a circuit board 142, the image sensor 141, a substrate 143, a driving circuit board 144, the driving module and an imaging lens assembly (its reference numeral is omitted), wherein the imaging lens assembly includes the imaging lens element set 131 and a lens barrel 132. Therefore, it can provide the camera module 100 with auto-focusing and optical image stabilization.

The driving module includes a base 110, a first shiftable plate 121, a second shiftable plate 122 and a carrier 123. A plurality of first rolling members 124 are disposed between the first shiftable plate 121 and the carrier 123, so that the first shiftable plate 121 is movable relative to the base 110 along a first direction D1. A plurality of second rolling members 125 are disposed between the second shiftable plate 122 and the first shiftable plate 121, so that the second shiftable plate 122 is movable relative to the first shiftable plate 121 along a second direction D2, and the second direction D2 is orthogonal to the first direction D1. A plurality of third rolling members 126 are disposed between the carrier 123 and the second shiftable plate 122, so that the carrier 123 is movable relative to the second shiftable plate 122 along a third direction D3, and the third direction D3 is orthogonal to the first direction D1 and the second direction D2. Specifically, the driving module which is shiftable in three axes can be obtained via the 1st embodiment, a stability of the movement is increased via a configuration of the first shiftable plate 121, the second shiftable plate 122, the first rolling members 124, the second rolling members 125 and the third rolling members 126, and miniaturization can be achieved.

Each of the carrier 123, the first shiftable plate 121 and the second shiftable plate 122 has an opening. The carrier 123 has an opening 123a, the first shiftable plate 121 has an opening 121a, the second shiftable plate 122 has an opening 122a, and all of the openings 121a, 122a, 123a are towards the third direction D3. Moreover, the substrate 143 has an opening 143a, the base 110 has an opening 110a, and both of the openings 143a, 110a are towards the third direction D3. An optical axis X of the imaging lens element set 131 passes through the openings 121a, 122a, 123a, 143a, 110a, and the optical axis X is parallel to the third direction D3.

The imaging lens element set 131 is disposed in the carrier 123 and has the optical axis X, wherein the optical axis X is parallel to the third direction D3. The image sensor 141 is for converting a light passing through the imaging lens element set 131 into an image signal. Furthermore, the imaging lens element set 131 is installed in the carrier 123 after disposed in the lens barrel 132.

In FIG. 1A, the driving module further includes a plurality of first grooves 124a, wherein the first grooves 124a are disposed between the base 110 and the first shiftable plate 121, and the first rolling members 124 are disposed in the first grooves 124a. Therefore, a process of assembling can be simplified, and reliability of products can be enhanced.

The driving module further includes a plurality of second grooves 125a, wherein the second grooves 125a are disposed between the first shiftable plate 121 and the second shiftable plate 122, and the second rolling members 125 are disposed in the second grooves 125a. Therefore, a process of assembling can be simplified, and reliability of products can be enhanced.

Figure 1C:
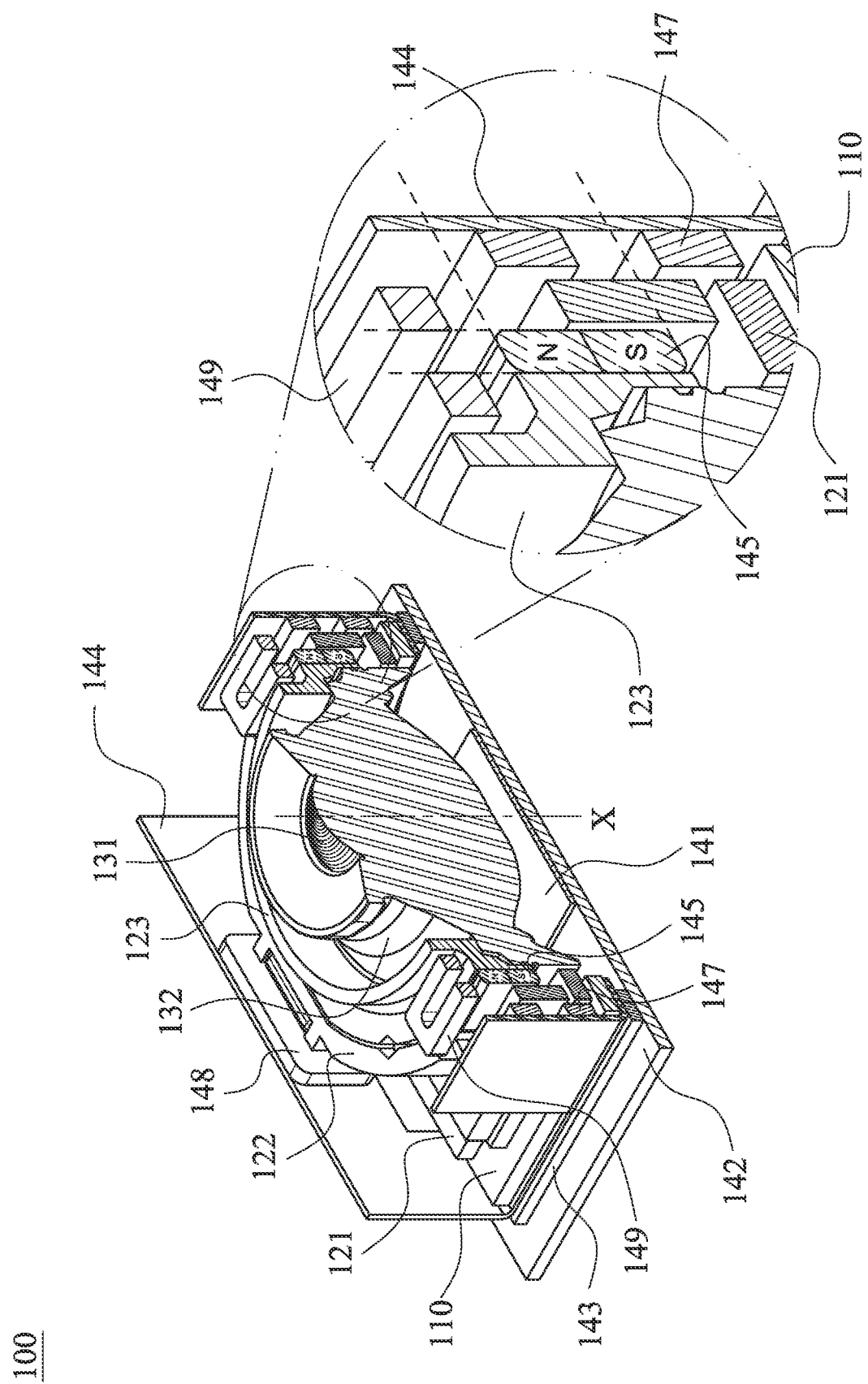
FIG. 1C is a partially cross-sectional view of the camera module according to the 1st embodiment in FIG. 1A.
Figure 1D:
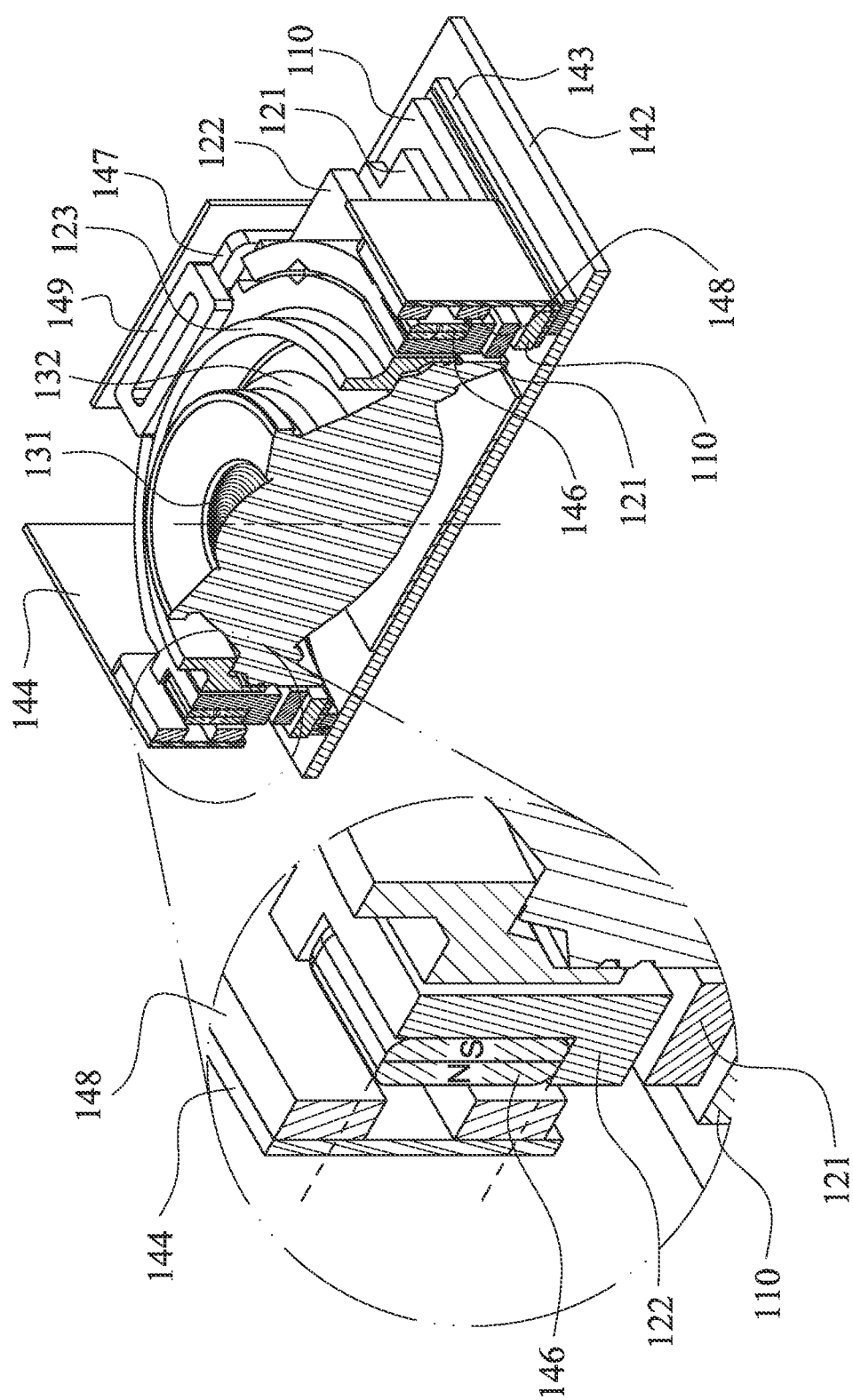
FIG. 1D is another partially cross-sectional view of the camera module according to the 1st embodiment in FIG. 1A.
Figure 1E:
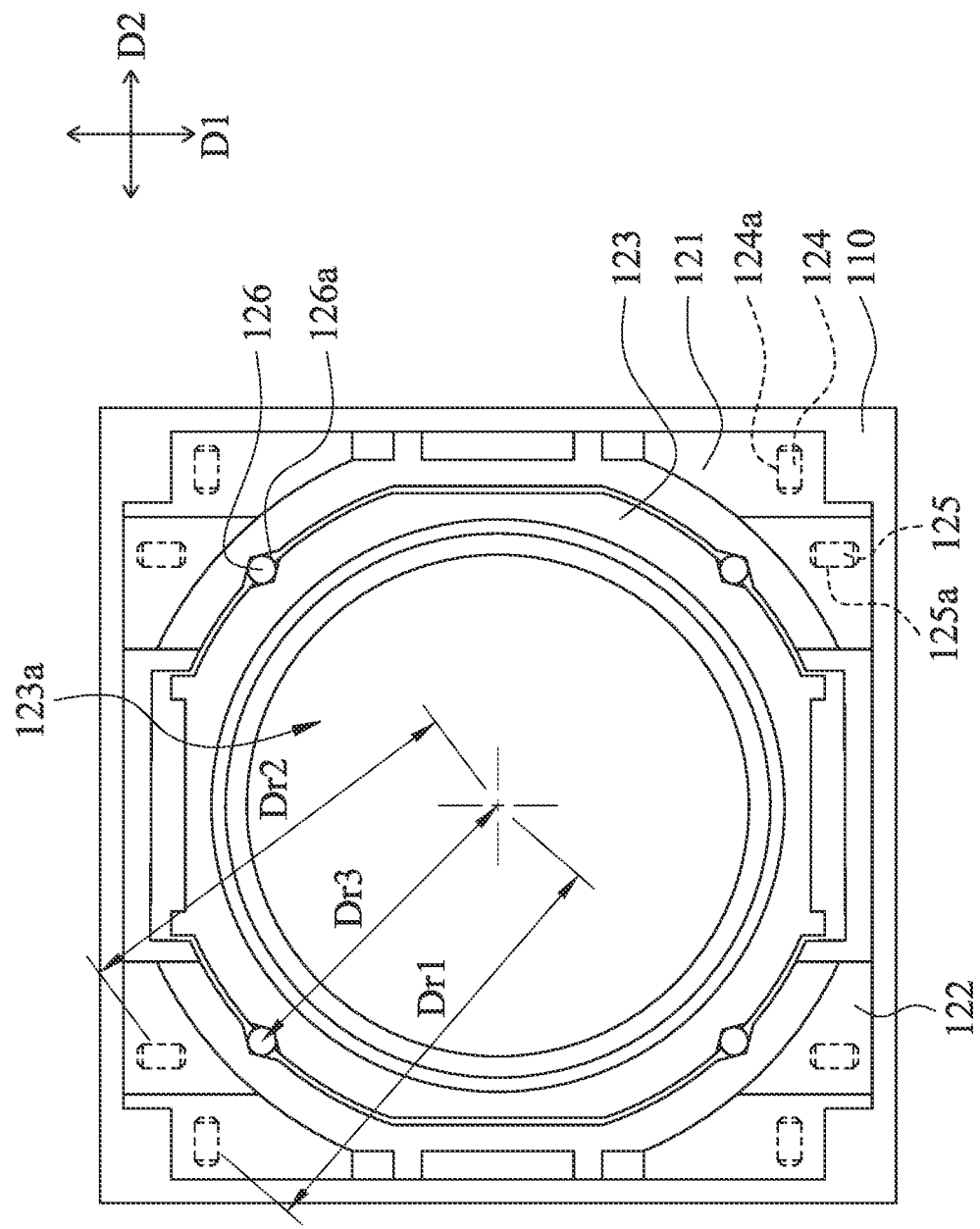
FIG. 1E is a top schematic view of a relation between a center of a carrier and a center of each of first rolling members, second rolling members, and third rolling members according to the 1st embodiment in FIG. 1A.

The driving module further includes a plurality of third grooves 126a (as shown in FIG. 1E), wherein the third grooves 126a are disposed between the second shiftable plate 122 and the carrier 123, and the third rolling members 126 are disposed in the third grooves 126a. Therefore, a shock resistance of the driving module can be improved, and the third rolling members 126 can be prevented from detaching.

According to the 1st embodiment, all of the first rolling members 124 and the second rolling members 125 are cylinders. Therefore, all of the first rolling members 124 and the second rolling members 125 can be rolled in the form of rollers, a degree of freedom in one direction can be provided, and a complexity of the structure is decreased. In detail, the first rolling members 124 extend along the second direction D2, and the second rolling members 125 extend along the first direction D1. Specifically, an extending direction of the first rolling members 124 and an extending direction of the second rolling members 125 are perpendicular to each other so that the utilization in the space can be more efficient.

Each of a number of the first rolling members 124 and a number of the second rolling members 125 is at least two. Therefore, the driving module can be prevented from tilting so as to enhance the stability of shifting. A number of the third rolling members 126 is at least four, and the third rolling members 126 are symmetrically disposed around a center of the opening 123a of the carrier 123. Furthermore, the third rolling members 126 can be balls or cylinders, but the present disclosure is not limited thereto. Therefore, a supporting force can be provided for the axial movement without disposing a spring leaf or a magnetic yoke. According to the 1st embodiment, a number of the first rolling members 124 is four, a number of the second rolling members 125 is four, a number of the third rolling members 126 is eight, and the third rolling members 126 are balls, but the present disclosure is not limited thereto.

Both of the first shiftable plate 121 and the second shiftable plate 122 are made of plastic material and formed by injection molding. Therefore, a higher size accuracy and manufacturing productivity can be provided. Moreover, at least one of the first shiftable plate 121 and the second shiftable plate 122 includes at least two gate traces 127. According to the 1st embodiment, the first shiftable plate 121 includes the gate traces 127 and a number of the gate traces 127 is two. Therefore, a forming efficiency can be improved, and a forming tolerance can be decreased.

FIG. 1C is a partially cross-sectional view of the camera module 100 according to the 1st embodiment in FIG. 1A, and FIG. 1D is another partially cross-sectional view of the camera module 100 according to the 1st embodiment in FIG.

1A. In FIG. 1A to FIG. 1D, the driving module further includes a first magnet 145, a second magnet 146, a first optical image stabilizing coil 147, a second optical image stabilizing coil 148 and an auto-focusing coil 149. A polarization direction of the first magnet 145 and a polarization direction of the second magnet 146 are different. The first optical image stabilizing coil 147 and the second optical image stabilizing coil 148 are corresponding to the first magnet 145 and the second magnet 146, respectively. The auto-focusing coil 149 is corresponding to one of the first magnet 145 and the second magnet 146. Therefore, a configuration of a multi-axial driving magnetic circuit can be provided, two horizontal driving forces can be provided respectively so as to achieve optical image stabilization in two dimensions, and an axial driving force can be provided so as to achieve the function of auto-focusing.

In FIG. 1C and FIG. 1D, according to the 1st embodiment, the polarization direction of the first magnet 145 is parallel to the third direction D3, and the polarization direction of the second magnet 146 is parallel to the second direction D2, wherein the polarization direction of the first magnet 145 and the polarization direction of the second magnet 146 are shown in FIG. 1C and FIG. 1D as directions from N pole to S pole, respectively. The top half of the first optical image stabilizing coil 147 and the first magnet 145 face to each other along the first direction D1. The second optical image stabilizing coil 148 and the second magnet 146 face to each other along the second direction D2. The auto-focusing coil 149 and the first magnet 145 face to each other along the third direction D3.

The auto-focusing coil 149, the first optical image stabilizing coil 147 and the second optical image stabilizing coil 148 are electrically connected to the driving circuit board 144. Therefore, the driving circuit board 144 can provide a driving current. Moreover, the first optical image stabilizing coil 147 can drive the imaging lens element set 131 to move relative to the base 110 along the first direction D1. The second optical image stabilizing coil 148 can drive the imaging lens element set 131 to move relative to the base 110 along the second direction D2. The auto-focusing coil 149 can drive the imaging lens element set 131 to move relative to the base 110 along the third direction D3.

It is worth to be mentioned that the first optical image stabilizing coil 147 or the second optical image stabilizing coil 148 can share the first magnet 145 or the second magnet 146 with the auto-focusing coil 149. Hence, an electromagnetic driving form of the first optical image stabilizing coil 147 corresponding to the first magnet 145 and an electromagnetic driving form of the second optical image stabilizing coil 148 corresponding to the second magnet 146 are slightly different. Furthermore, in the condition that a height of the first optical image stabilizing coil 147 and a height of the second optical image stabilizing coil 148 are different along a direction of the optical axis X, thus the condition that the first optical image stabilizing coil 147 or the second optical image stabilizing coil 148 share the first magnet 145 or the second magnet 146 with the auto-focusing coil 149, can be satisfied, but the present disclosure is not limited thereto. Moreover, a height of the first magnet 145 along the optical axis X and a height of the second magnet 146 along the optical axis X can be different. A space usage of the driving module and a number of elements can be decreased via a configuration of the shared first magnet 145 or second magnet 146.

FIG. 1E is a top schematic view of a relation between a center of the carrier 123 and a center of each of the first rolling members 124, the second rolling members 125, and the third rolling members 126 according to the 1st embodiment in FIG. 1A. In FIG. 1E, when a distance between the center of the opening 123a of the carrier 123 and a center of each of the first rolling members 124 is Dr1, a distance between the center of the opening 123a of the carrier 123 and a center of each of the second rolling members 125 is Dr2, and a distance between the center of the opening 123a of the carrier 123 and a center of each of the third rolling members 126 is Dr3, the condition related to the parameters can be satisfied as the following table 1.

TABLE1

| the 1st embodiment | | | |
|---|---|---|---|
| Dr1 (mm) | 9.39 | Dr3 (mm) | 7.05 |
| Dr2 (mm) | 8.86 | (Dr1 + Dr2)/2 (mm) | 9.125 |

2nd Embodiment

Figure 2A:
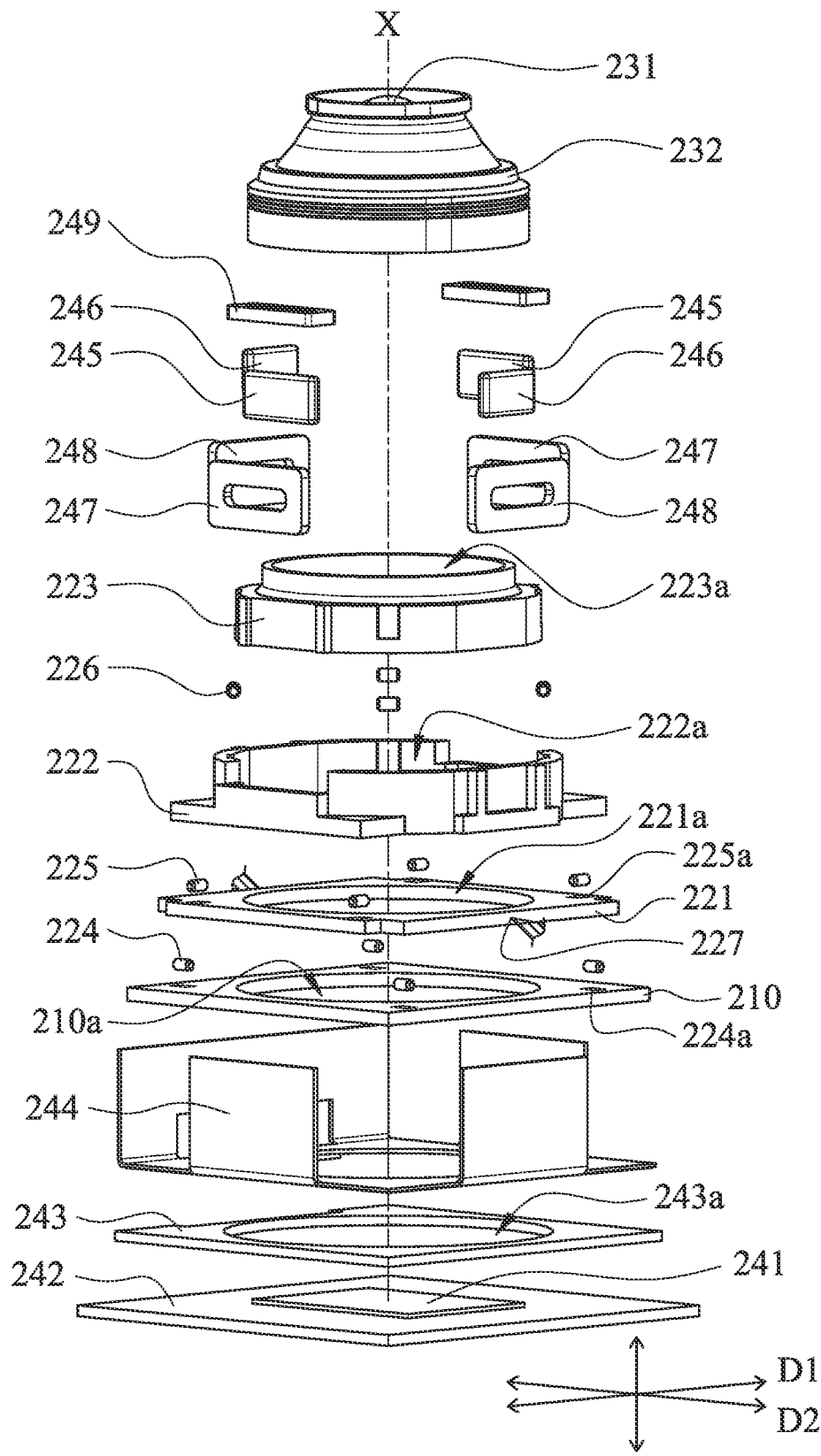
FIG. 2A is an exploded view of a camera module according to the 2nd embodiment of the present disclosure.

FIG. 2A is an exploded view of a camera module 200 according to the 2nd embodiment of the present disclosure. In FIG. 2A, the camera module 200 includes a driving module (its reference numeral is omitted), an imaging lens element set 231 and an image sensor 241. Furthermore, according to the 2nd embodiment, the camera module 200 from an object side to an image side includes a circuit board 242, the image sensor 241, a substrate 243, a driving circuit board 244, the driving module and an imaging lens assembly (its reference numeral is omitted), wherein the imaging lens assembly includes the imaging lens element set 231 and a lens barrel 232. Therefore, it can provide the camera module 200 with auto-focusing and optical image stabilization.

The driving module includes a base 210, a first shiftable plate 221, a second shiftable plate 222 and a carrier 223. A plurality of first rolling members 224 are disposed between the first shiftable plate 221 and the carrier 223, so that the first shiftable plate 221 is movable relative to the base 210 along a first direction D1. A plurality of second rolling members 225 are disposed between the second shiftable plate 222 and the first shiftable plate 221, so that the second shiftable plate 222 is movable relative to the first shiftable plate 221 along a second direction D2, and the second direction D2 is orthogonal to the first direction D1. A plurality of third rolling members 226 are disposed between the carrier 223 and the second shiftable plate 222, so that the carrier 223 is movable relative to the second shiftable plate 222 along a third direction D3, and the third direction D3 is orthogonal to the first direction D1 and the second direction D2. Specifically, the driving module which is shiftable in three axes can be obtained via the 2nd embodiment, a stability of the movement is increased via a configuration of the first shiftable plate 221, the second shiftable plate 222, the first rolling members 224, the second rolling members 225 and the third rolling members 226, and miniaturization can be achieved.

Each of the carrier 223, the first shiftable plate 221 and the second shiftable plate 222 has an opening. The carrier 223 has an opening 223a, the first shiftable plate 221 has an opening 221a, the second shiftable plate 222 has an opening 222a, and all of the openings 221a, 222a, 223a are towards the third direction D3. Moreover, the substrate 243 has an opening 243a, the base 210 has an opening 210a, and both of the openings 243a, 210a are towards the third direction D3. An optical axis X of the imaging lens element set 231 passes through the openings 221a, 222a, 223a, 243a, 210a, and the optical axis X is parallel to the third direction D3.

The imaging lens element set 231 is disposed in the carrier 223 and has the optical axis X, wherein the optical axis X is parallel to the third direction D3. The image sensor 241 is for converting a light passing through the imaging lens element set 231 into an image signal. Furthermore, the imaging lens element set 231 is installed in the carrier 223 after disposed in the lens barrel 232.

In FIG. 2A, the driving module further includes a plurality of first grooves 224a, wherein the first grooves 224a are disposed between the base 210 and the first shiftable plate 221, and the first rolling members 224 are disposed in the first grooves 224a. Therefore, a process of assembling can be simplified, and reliability of products can be enhanced.

The driving module further includes a plurality of second grooves 225a, wherein the second grooves 225a are disposed between the first shiftable plate 221 and the second shiftable plate 222, and the second rolling members 225 are disposed in the second grooves 225a. Therefore, a process of assembling can be simplified, and reliability of products can be enhanced.

Figure 2B:
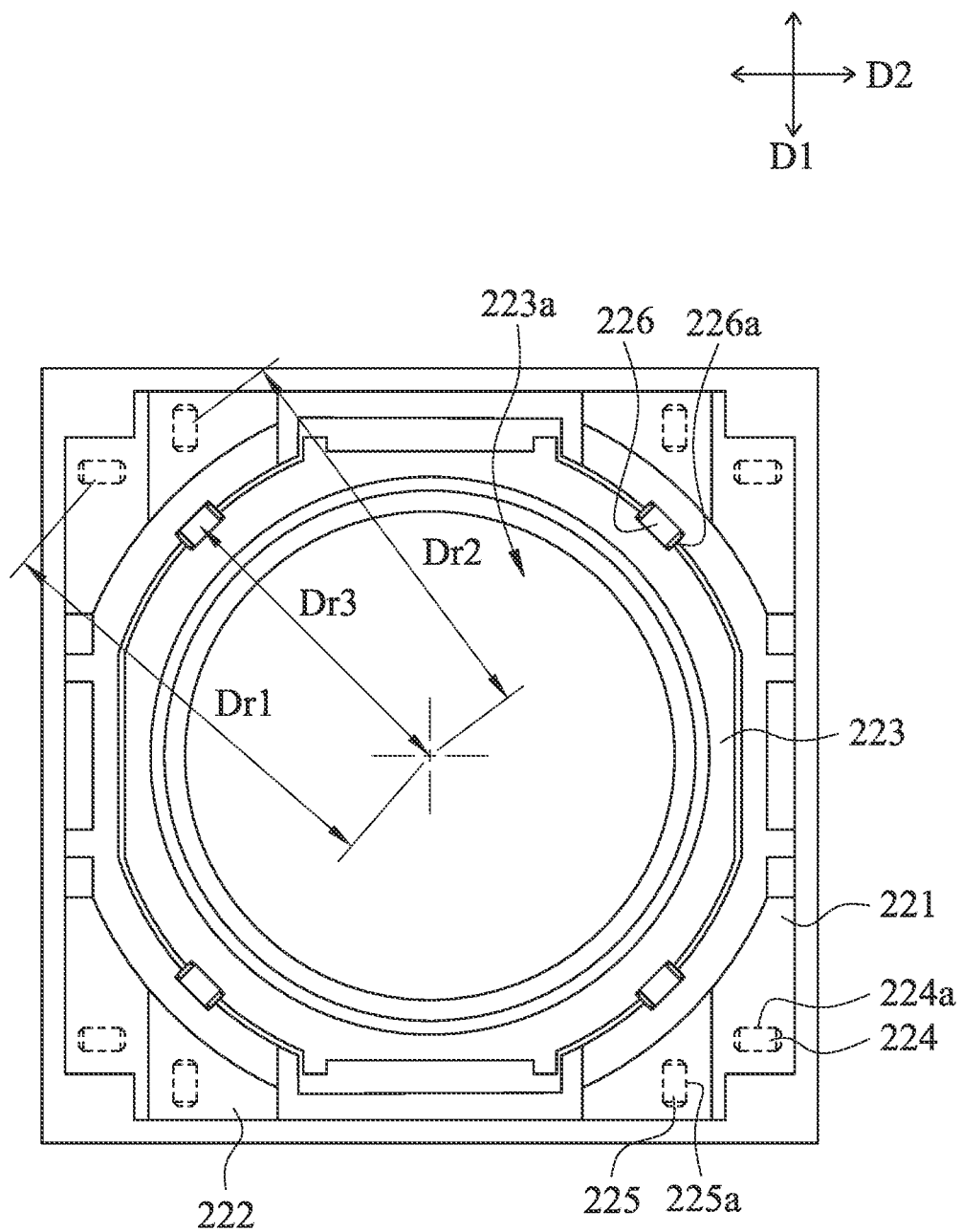
FIG. 2B is a top schematic view of a relation between a center of a carrier and a center of each of first rolling members, second rolling members, and third rolling members according to the 2nd embodiment in FIG. 2A.

The driving module further includes a plurality of third grooves 226a (as shown in FIG. 2B), wherein the third grooves 226a are disposed between the second shiftable plate 222 and the carrier 223, and the third rolling members 226 are disposed in the third grooves 226a. Therefore, a shock resistance of the driving module can be improved, and the third rolling members 226 can be prevented from detaching.

According to the 2nd embodiment, all of the first rolling members 224 and the second rolling members 225 are cylinders. Therefore, all of the first rolling members 224 and the second rolling members 225 can be rolled in the form of rollers, a degree of freedom in one direction can be provided, and a complexity of the structure is decreased. In detail, the first rolling members 224 extend along the second direction D2, and the second rolling members 225 extend along the first direction D1. Specifically, an extending direction of the first rolling members 224 and an extending direction of the second rolling members 225 are perpendicular to each other so that the utilization in the space can be more efficient.

Each of a number of the first rolling members 224 and a number of the second rolling members 225 is at least two. Therefore, the driving module can be prevented from tilting so as to enhance the stability of shifting. A number of the third rolling members 226 is at least four, and the third rolling members 226 are symmetrically disposed around a center of the opening 223a of the carrier 223. Furthermore, the third rolling members 226 can be balls or cylinders, but the present disclosure is not limited thereto. Therefore, a supporting force can be provided for the axial movement without disposing a spring leaf or a magnetic yoke. According to the 2nd embodiment, a number of the first rolling members 224 is four, a number of the second rolling members 225 is four, a number of the third rolling members 226 is four, and the third rolling members 226 are cylinders, but the present disclosure is not limited thereto.

Both of the first shiftable plate 221 and the second shiftable plate 222 are made of plastic material and formed by injection molding. Therefore, a higher size accuracy and manufacturing productivity can be provided. Moreover, at least one of the first shiftable plate 221 and the second shiftable plate 222 includes at least two gate traces 227. According to the 2nd embodiment, the first shiftable plate 221 includes the gate traces 227, and a number of the gate traces 227 is two. Therefore, a forming efficiency can be improved, and a forming tolerance can be decreased.

Furthermore, the driving module further includes a first magnet 245, a second magnet 246, a first optical image stabilizing coil 247, a second optical image stabilizing coil 248 and an auto-focusing coil 249. A polarization direction of the first magnet 245 and a polarization direction of the second magnet 246 are different. The first optical image stabilizing coil 247 and the second optical image stabilizing coil 248 are corresponding to the first magnet 245 and the second magnet 246, respectively. The auto-focusing coil 249 is corresponding to one of the first magnet 245 and the second magnet 246. Therefore, a configuration of a multi-axial driving magnetic circuit can be provided, two horizontal driving forces can be provided respectively so as to achieve optical image stabilization in two dimensions, and an axial driving force can be provided so as to achieve the function of auto-focusing.

According to the 2nd embodiment, the polarization direction of the first magnet 245 is parallel to the third direction D3, and the polarization direction of the second magnet 246 is parallel to the second direction D2. The top half of the first optical image stabilizing coil 247 and the first magnet 245 face to each other along the first direction D1. The second optical image stabilizing coil 248 and the second magnet 246 face to each other along the second direction D2. The auto-focusing coil 249 and the first magnet 245 face to each other along the third direction D3.

It is worth to be mentioned that the first optical image stabilizing coil 247 or the second optical image stabilizing coil 248 can share the first magnet 245 or the second magnet 246 with the auto-focusing coil 249. Hence, an electromagnetic driving form of the first optical image stabilizing coil 247 corresponding to the first magnet 245 and an electromagnetic driving form of the second optical image stabilizing coil 248 corresponding to the second magnet 246 are slightly different. Furthermore, in the condition that a height of the first optical image stabilizing coil 247 and a height of the second optical image stabilizing coil 248 are different along a direction of the optical axis X, thus the condition that the first optical image stabilizing coil 247 or the second optical image stabilizing coil 248 share the first magnet 245 or the second magnet 246 with the auto-focusing coil 249, can be satisfied, but the present disclosure is not limited thereto. Moreover, a height of the first magnet 245 along the optical axis X and a height of the second magnet 246 along the optical axis X can be different. A space usage of the driving module and a number of elements can be decreased via a configuration of the shared first magnet 245 or the second magnet 246.

FIG. 2B is a top schematic view of a relation between the center of the carrier 223 and a center of each of the first rolling members 224, the second rolling members 225, and the third rolling members 226 according to the 2nd embodiment in FIG. 2A. In FIG. 2B, when a distance between the center of the opening 223a of the carrier 223 and a center of each of the first rolling members 224 is Dr1, a distance between the center of the opening 223a of the carrier 223 and a center of each of the second rolling members 225 is Dr2, and a distance between the center of the opening 223a of the carrier 223 and a center of each of the third rolling members 226 is Dr3, the condition related to the parameters can be satisfied as the following table 2.

TABLE 2

| the 2nd embodiment | | | |
|---|---|---|---|
| Dr1 (mm) | 9.39 | Dr3 (mm) | 7.05 |
| Dr2 (mm) | 8.86 | (Dr1 + Dr2)/2 (mm) | 9.125 |

3rd Embodiment

Figure 3A:
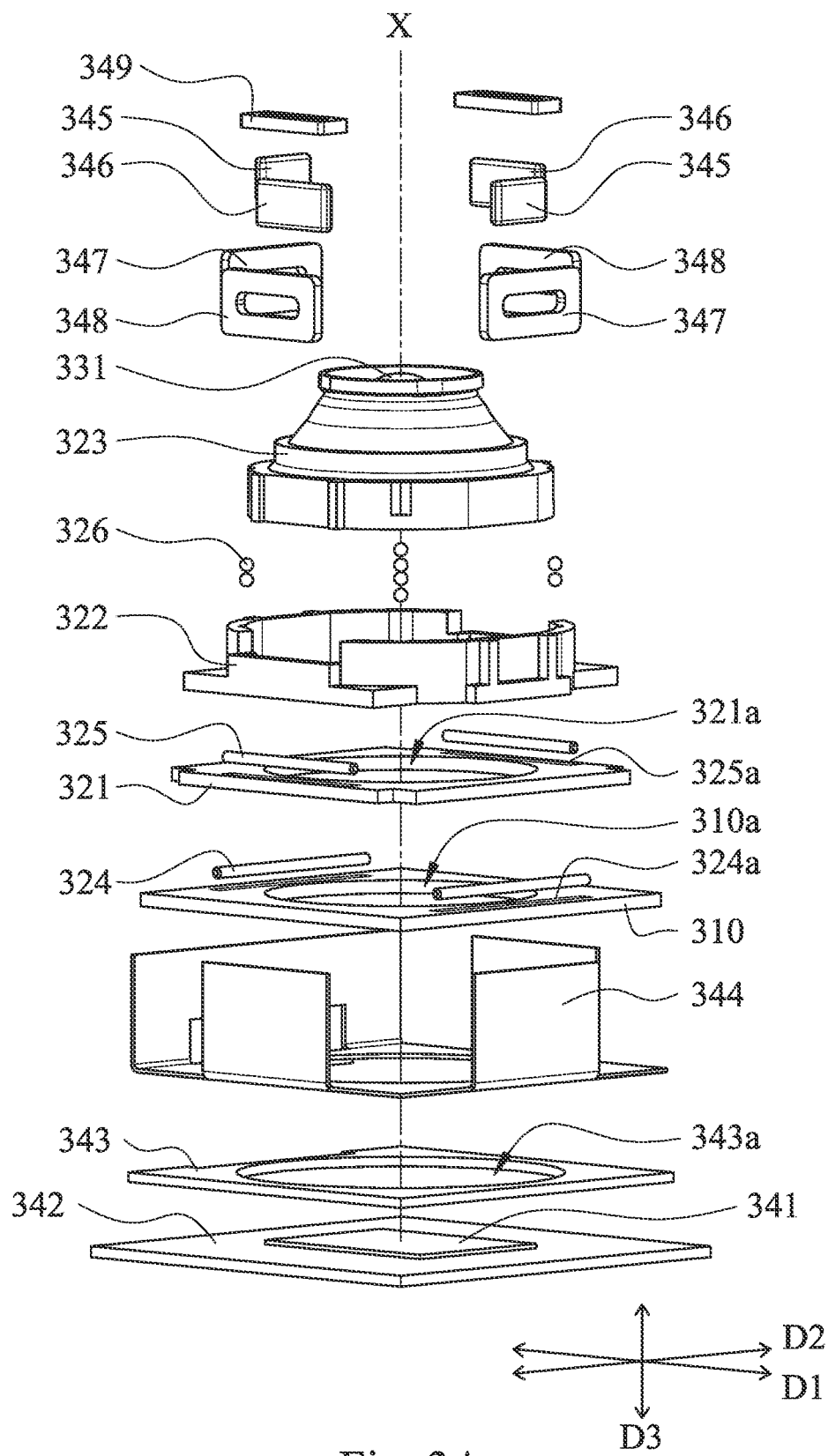
FIG. 3A is an exploded view of a camera module according to the 3rd embodiment of the present disclosure.

FIG. 3A is an exploded view of a camera module 300 according to the 3rd embodiment of the present disclosure. In FIG. 3A, the camera module 300 includes a driving module (its reference numeral is omitted), an imaging lens element set 331 and an image sensor 341. Furthermore, according to the 3rd embodiment, the camera module 300 from an object side to an image side includes a circuit board 342, the image sensor 341, a substrate 343, a driving circuit board 344, the driving module and an imaging lens assembly (its reference numeral is omitted), wherein the imaging lens assembly includes the imaging lens element set 331. Therefore, it can provide the camera module 300 with auto-focusing and optical image stabilization.

The driving module includes a base 310, a first shiftable plate 321, a second shiftable plate 322 and a carrier 323. A plurality of first rolling members 324 are disposed between the first shiftable plate 321 and the carrier 323, so that the first shiftable plate 321 is movable relative to the base 310 along a first direction D1. A plurality of second rolling members 325 are disposed between the second shiftable plate 322 and the first shiftable plate 321, so that the second shiftable plate 322 is movable relative to the first shiftable plate 321 along a second direction D2, and the second direction D2 is orthogonal to the first direction D1. A plurality of third rolling members 326 are disposed between the carrier 223 and the second shiftable plate 322, so that the carrier 323 is movable relative to the second shiftable plate 322 along a third direction D3, and the third direction D3 is orthogonal to the first direction D1 and the second direction D2. Specifically, the driving module which is shiftable in three axes can be obtained via the 3rd embodiment, a stability of the movement is increased via a configuration of the first shiftable plate 321, the second shiftable plate 322, the first rolling members 324, the second rolling members 325 and the third rolling members 326, and miniaturization can be achieved.

Each of the carrier 323, the first shiftable plate 321 and the second shiftable plate 322 has an opening. The carrier 323 has an opening 323a, the first shiftable plate 321 has an opening 321a, the second shiftable plate 322 has an opening 322a, and all of the openings 321a, 322a, 323a are towards the third direction D3. Moreover, the substrate 343 has an opening 343a, the base 310 has an opening 310a, and both of the openings 343a, 310a are towards the third direction D3. An optical axis X of the imaging lens element set 331 passes through the openings 321a, 322a, 323a, 343a, 310a, and the optical axis X is parallel to the third direction D3.

The imaging lens element set 331 is disposed in the carrier 323 and has the optical axis X, wherein the optical axis X is parallel to the third direction D3. The image sensor 341 is for converting a light passing through the imaging lens element set 331 into an image signal. Furthermore, the carrier 323 has a assembling function of a lens barrel, so the imaging lens element set 331 and the carrier 323 are the integrated imaging lens assembly.

In FIG. 3A, the driving module further includes a plurality of first grooves 324a, wherein the first grooves 324a are disposed between the base 310 and the first shiftable plate 321, and the first rolling members 324 are disposed in the first grooves 324a. Therefore, a process of assembling can be simplified, and reliability of products can be enhanced.

Figure 3B:
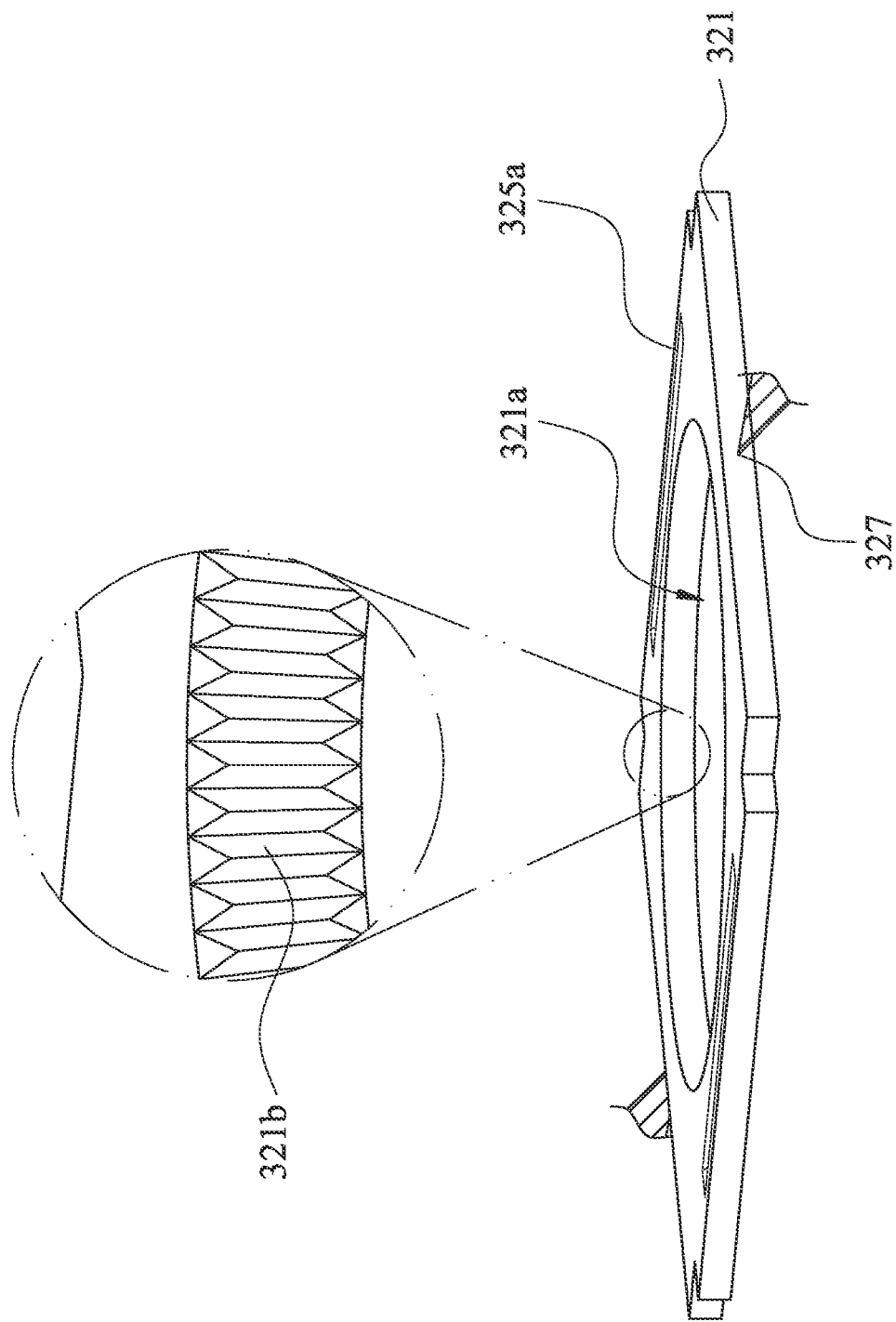
FIG. 3B is a schematic view of a first shiftable plate according to the 3rd embodiment in FIG. 3A.

FIG. 3B is a schematic view of the first shiftable plate 321 according to the 3rd embodiment in FIG. 3A. In FIG. 3A and FIG. 3B, the driving module further includes a plurality of second grooves 325a, wherein the second grooves 325a are disposed between the first shiftable plate 321 and the second shiftable plate 322, and the second rolling members 325 are disposed in the second grooves 325a. Therefore, a process of assembling can be simplified, and reliability of products can be enhanced.

Figure 3C:
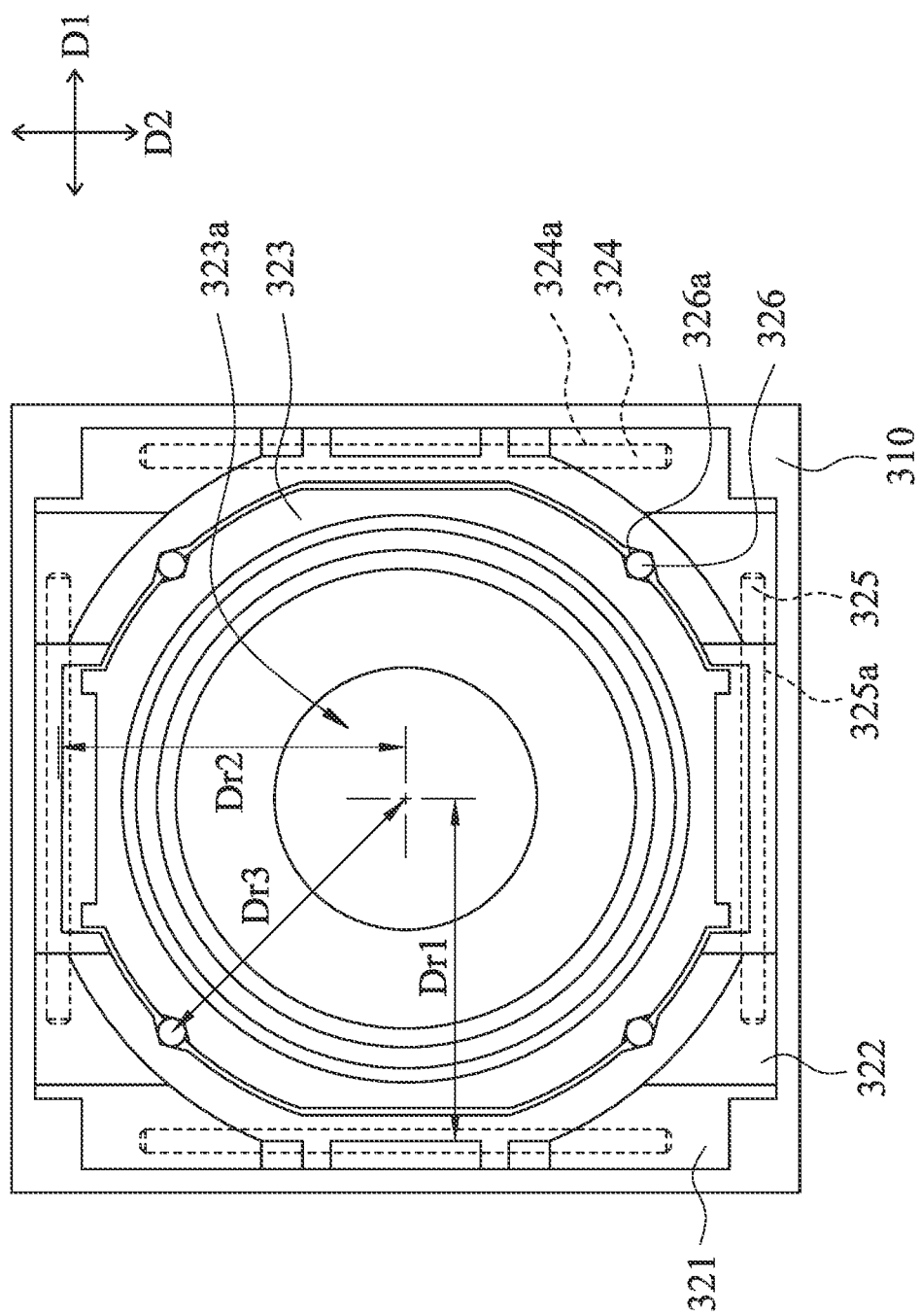
FIG. 3C is a top schematic view of a relation between a center of a carrier and a center of each of first rolling members, second rolling members, and third rolling members according to the 3rd embodiment in FIG. 3A.

The driving module further includes a plurality of third grooves 326a (as shown in FIG. 3C), wherein the third grooves 326a are disposed between the second shiftable plate 322 and the carrier 323, and the third rolling members 326 are disposed in the third grooves 326a. Therefore, a shock resistance of the driving module can be improved, and the third rolling members 326 can be prevented from detaching.

According to the 3rd embodiment, all of the first rolling members 324 and the second rolling members 325 are cylinders. Therefore, all of the first rolling members 324 and the second rolling members 325 can be rolled in the form of rollers, a degree of freedom in one direction can be provided, and a complexity of the structure is decreased. In detail, the first rolling members 324 extend along the second direction D2, and the second rolling members 325 extend along the first direction D1. Specifically, an extending direction of the first rolling members 324 and an extending direction of the second rolling members 325 are perpendicular to each other so that the utilization in the space can be more efficient.

Each of a number of the first rolling members 324 and a number of the second rolling members 325 is at least two. Therefore, the driving module can be prevented from tilting so as to enhance the stability of shifting. A number of the third rolling members 326 is at least four, and the third rolling members 326 are symmetrically disposed around a center of the opening 323a of the carrier 323. Furthermore, the third rolling members 326 can be balls or cylinders, but the present disclosure is not limited thereto. Therefore, a supporting force can be provided for the axial movement without disposing a spring leaf or a magnetic yoke. According to the 3rd embodiment, a number of the first rolling members 324 is two, a number of the second rolling members 325 is two, a number of the third rolling members 326 is eight, and the third rolling members 326 are balls, but the present disclosure is not limited thereto.

Both of the first shiftable plate 321 and the second shiftable plate 322 are made of plastic material and formed by injection molding. Therefore, a higher size accuracy and manufacturing productivity can be provided. Moreover, at least one of the first shiftable plate 321 and the second shiftable plate 322 includes at least two gate traces 327. According to the 3rd embodiment, the first shiftable plate 321 includes the gate traces 327, and a number of the gate traces 327 is two. Therefore, a forming efficiency can be improved, and a forming tolerance can be decreased.

In FIG. 3B, at least one of the opening 321a of the first shiftable plate 321 and the opening 322a of the second shiftable plate 322 includes a plurality of strip-shaped wedge structures 321b. According to the 3rd embodiment, the opening 321a of the first shiftable plate 321 includes the strip-shaped wedge structures 321b. The strip-shaped wedge structures 321b are arranged around the opening 321a of the first shiftable plate 321, and the strip-shaped wedge structures 321b extend along a direction away from a center of the opening 321a of the first shiftable plate 321 and taper towards the object side. Therefore, a possibility of generating non-imaging light can be decreased.

Furthermore, the driving module further includes a first magnet 345, a second magnet 346, a first optical image stabilizing coil 347, a second optical image stabilizing coil 348 and an auto-focusing coil 349. A polarization direction of the first magnet 345 and a polarization direction of the second magnet 346 are different. The first optical image stabilizing coil 347 and the second optical image stabilizing coil 348 are corresponding to the first magnet 345 and the second magnet 346, respectively. The auto-focusing coil 349 is corresponding to one of the first magnet 345 and the second magnet 346. Therefore, a configuration of a multi-axial driving magnetic circuit can be provided, two horizontal driving forces can be provided respectively so as to achieve optical image stabilization in two dimensions, and an axial driving force can be provided so as to achieve the function of auto-focusing.

According to the 3rd embodiment, the polarization direction of the first magnet 345 is parallel to the first direction D1, and the polarization direction of the second magnet 346 is parallel to the third direction D3. The first optical image stabilizing coil 347 and the first magnet 345 face to each other along the first direction D1. The top half of the second optical image stabilizing coil 348 and the second magnet 346 face to each other along the second direction D2. The auto-focusing coil 349 and the second magnet 346 face to each other along the third direction D3.

It is worth to be mentioned that the first optical image stabilizing coil 347 or the second optical image stabilizing coil 348 can share the first magnet 345 or the second magnet 346 with the auto-focusing coil 349. Hence, an electromagnetic driving form of the first optical image stabilizing coil 347 corresponding to the first magnet 345 and an electromagnetic driving form of the second optical image stabilizing coil 348 corresponding to the second magnet 346 are slightly different. Furthermore, in the condition that a height of the first optical image stabilizing coil 347 and a height of the second optical image stabilizing coil 348 are different along a direction of the optical axis X, thus the condition that the first optical image stabilizing coil 347 or the second optical image stabilizing coil 348 share the first magnet 345 or the second magnet 346 with the auto-focusing coil 349, can be satisfied, but the present disclosure is not limited thereto. Moreover, a height of the first magnet 345 along the optical axis X and a height of the second magnet 346 along the optical axis X can be different. A space usage of the driving module and a number of elements can be decreased via a configuration of the shared first magnet 345 or second magnet 346.

FIG. 3C is a top schematic view of a relation between the center of the carrier 323 and a center of each of the first rolling members 324, the second rolling members 325, and the third rolling members 326 according to the 3rd embodiment in FIG. 3A. In FIG. 3C, when a distance between the center of the opening 323a of the carrier 323 and a center of each of the first rolling members 324 is Dr1, a distance between the center of the opening 323a of the carrier 323 and a center of each of the second rolling members 325 is Dr2, and a distance between the center of the opening 323a of the carrier 323 and a center of each of the third rolling members 326 is Dr3, the condition related to the parameters can be satisfied as the following table 3.

TABLE 3

| the 3rd embodiment | | | |
|---|---|---|---|
| Dr1 (mm) | 7.40 | Dr3 (mm) | 7.05 |
| Dr2 (mm) | 7.30 | (Dr1 + Dr2)/2 (mm) | 7.35 |

4th Embodiment

Figure 4A:
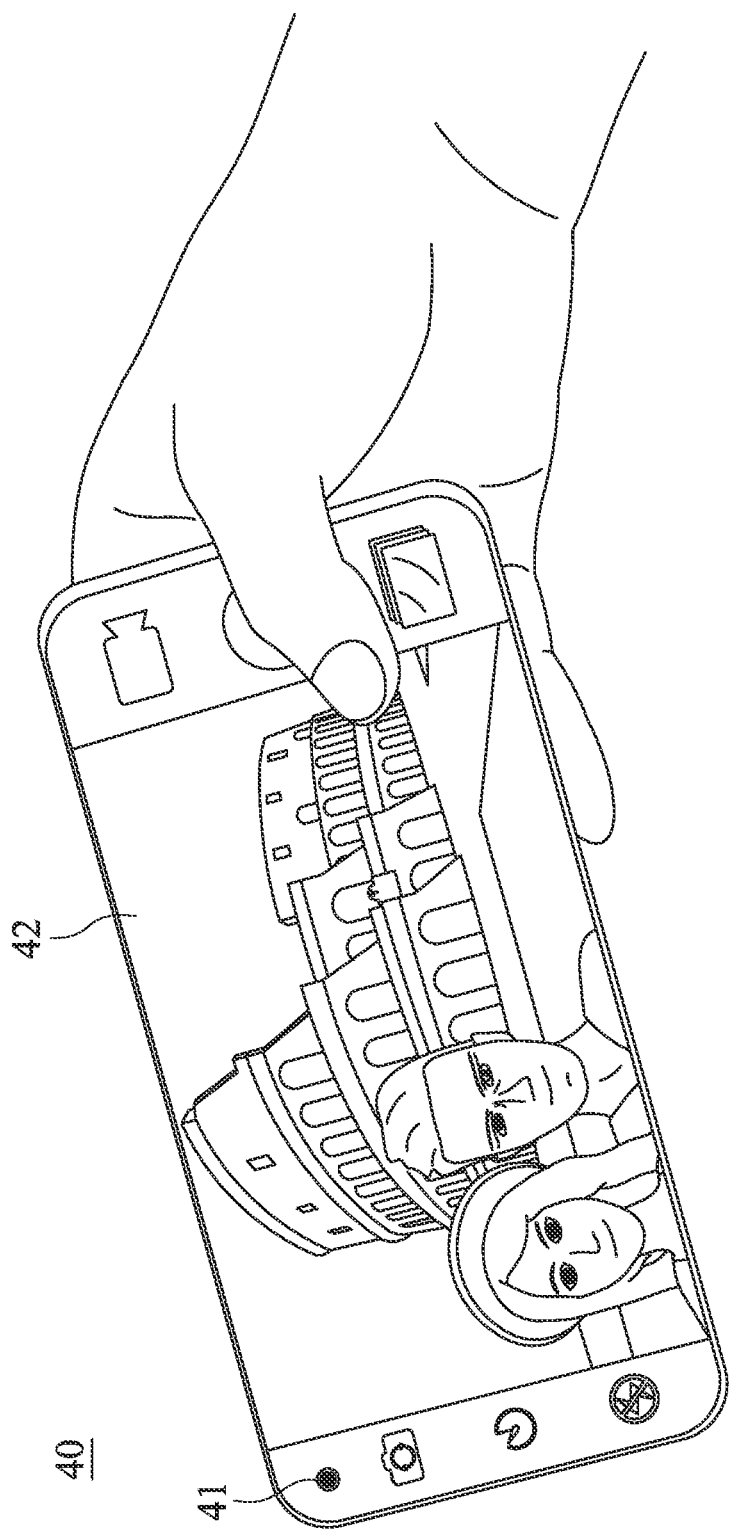
FIG. 4A is a schematic view of an electronic device according to the 4th embodiment of the present disclosure.
Figure 4B:
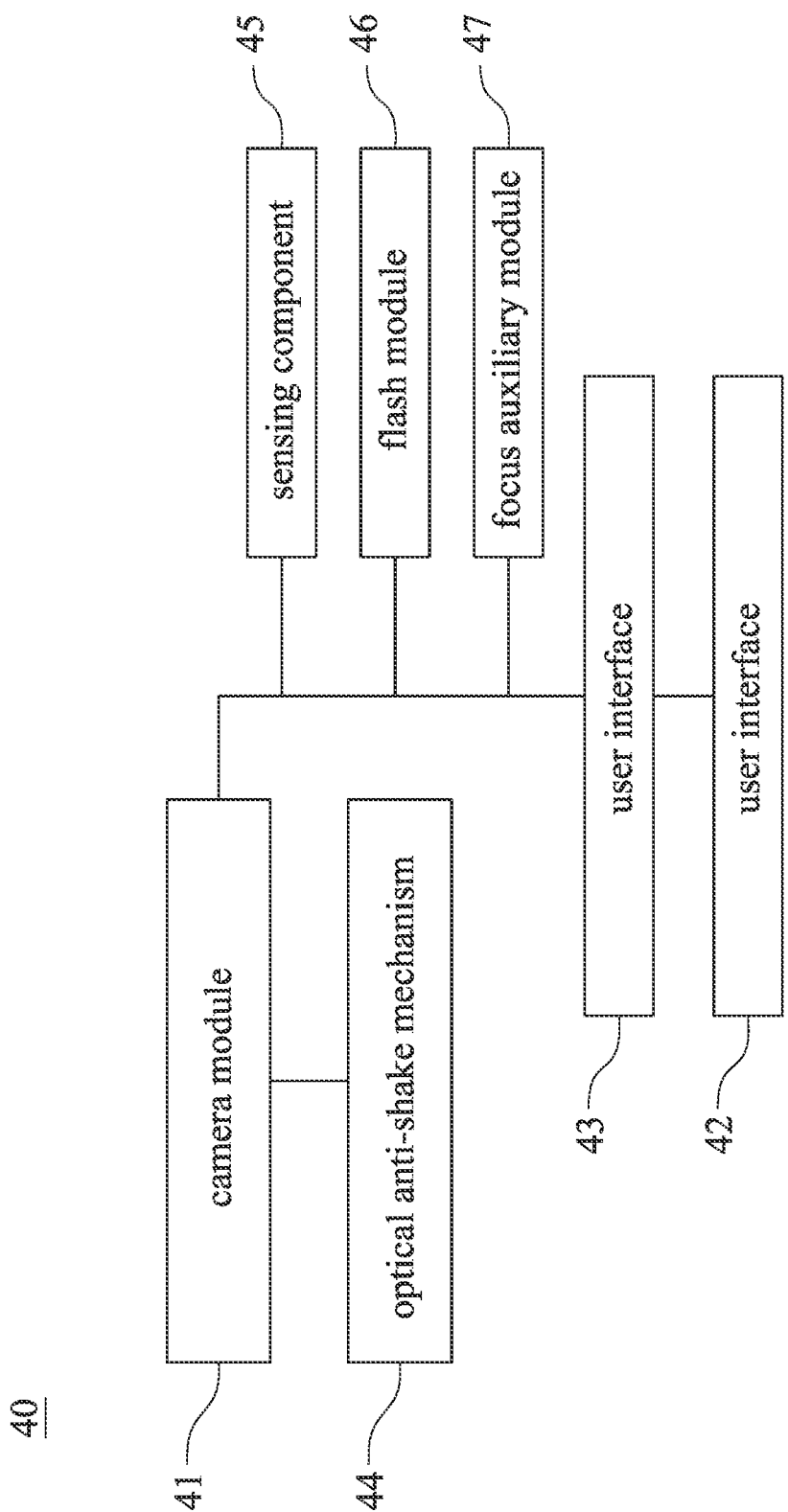
FIG. 4B is a block diagram of the electronic device according to the 4th embodiment in FIG. 4A.

FIG. 4A is a schematic view of an electronic device 40 according to the 4th embodiment of the present disclosure. FIG. 4B is a block diagram of the electronic device 40 according to the 4th embodiment in FIG. 4A. In FIGS. 4A and 4B, the electronic device 40 is a smart phone, and includes a camera module 41. The camera module 41 includes a driving module (not shown), an imaging lens element set (not shown) and an image sensor (not shown). The camera module according to the 4th embodiment is disposed on an area of side of a user interface 42, wherein the user interface 42 can be a touch screen or a display screen, but the present disclosure is not limited thereto. The camera module 41 can be one of the camera modules according to the aforementioned 1st embodiment to the 3rd embodiment, but the present disclosure is not limited thereto.

Furthermore, users enter a shooting mode via the user interface 42 of the electronic device 40. At this moment, the imaging light is gathered on the image sensor via the camera module 41, and an electronic signal about an image is output to an image signal processor (ISP) 43.

To meet a specification of the camera module of the electronic device 40, the electronic device 40 can further include an optical anti-shake mechanism 44, which can be an optical image stabilization (OIS). Furthermore, the electronic device 40 can further include at least one auxiliary optical element (its reference numeral is omitted) and at least one sensing element 45. According to the 4th embodiment, the auxiliary optical element is a flash module 46 and a focusing assisting module 47. The flash module 46 can be used for compensating a color temperature, and the focusing assisting module 47 can be an infrared distance measurement component, a laser focus module, etc. The sensing element 45 can have functions for sensing physical momentum and kinetic energy, such as an accelerator, a gyroscope, a Hall Effect Element, to sense shaking or jitters applied by hands of the users or external environments. Accordingly, an auto-focusing mechanism and the optical anti-shake mechanism 44 disposed on the camera module 41 of the electronic device 40 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. In addition, the users can visually see a captured image of the camera through the touch screen and manually operate the view finding range on the touch screen to achieve the autofocus function of what you see is what you get.

Furthermore, the electronic device 40 can further include, but not be limited to, a display, a control unit, a storage unit, a random access memory (RAM), a read-only memory (ROM), or the combination thereof.

Figure 4C:
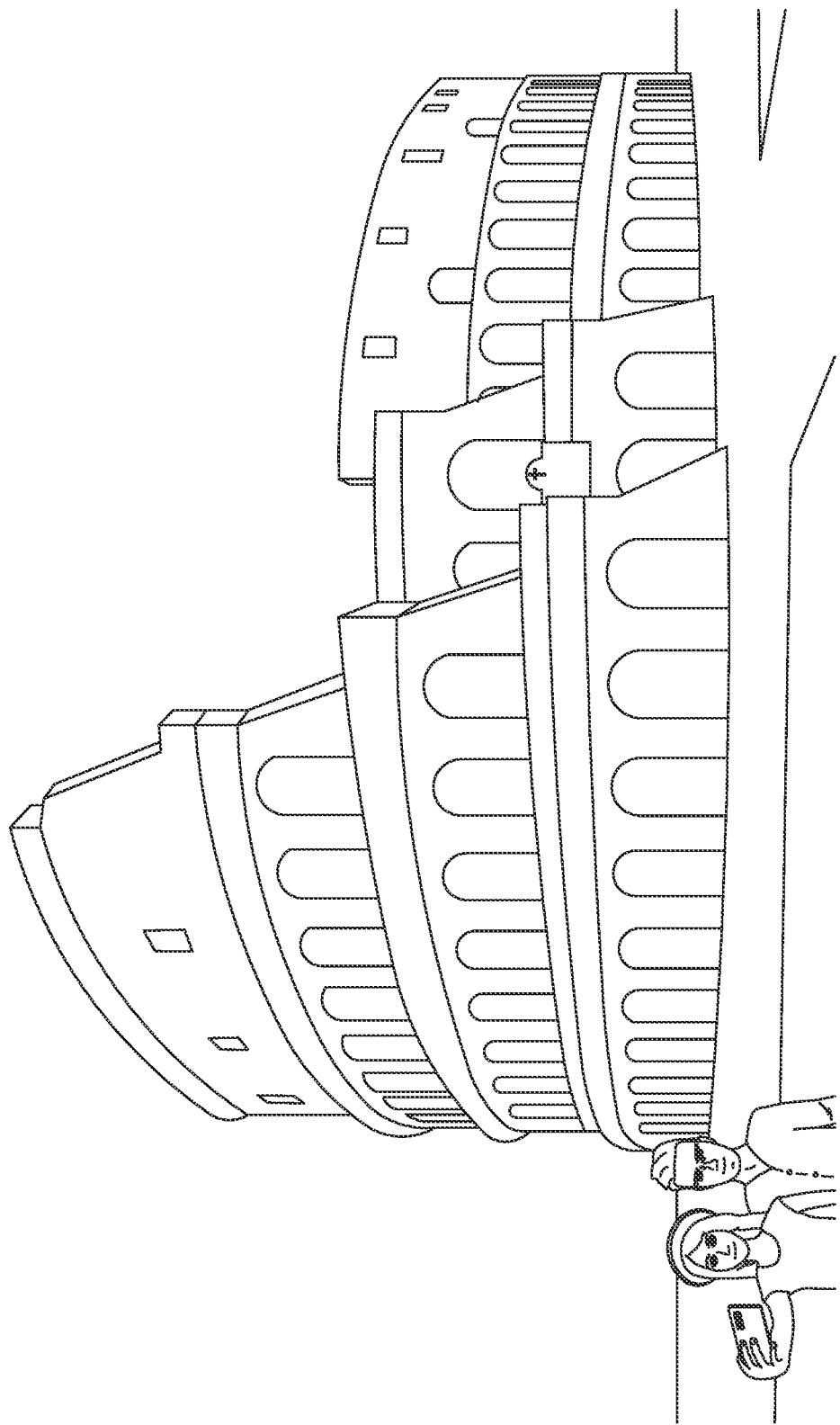
FIG. 4C is a schematic view of selfie scene according to the 4th embodiment in FIG. 4A.
Figure 4D:
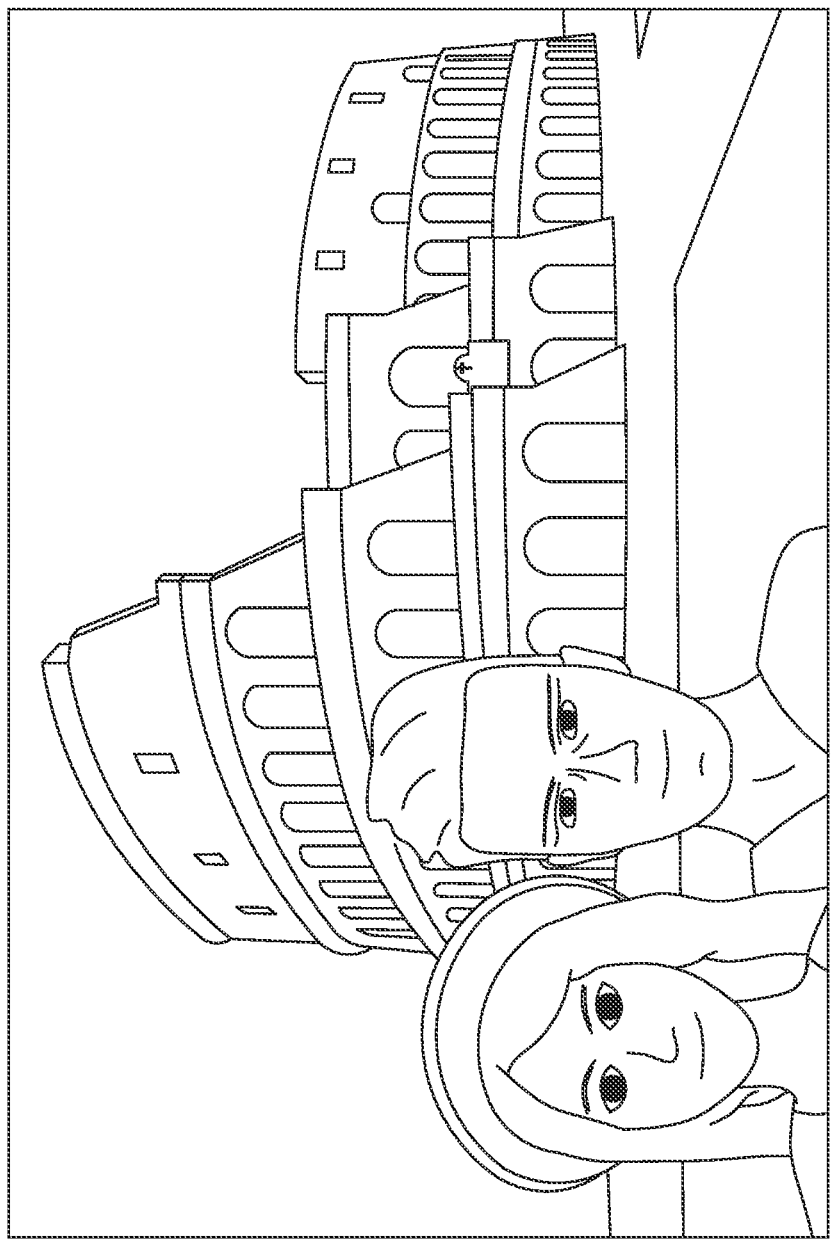
FIG. 4D is a schematic view of a captured image according to the 4th embodiment in FIG. 4A.

FIG. 4C is a schematic view of selfie scene according to the 4th embodiment in FIG. 4A. FIG. 4D is a schematic view of a captured image according to the 4th embodiment in FIG. 4A. In FIGS. 4A to 4D, the camera module 41 and the user interface 42 face towards the users. When proceeding selfie or live streaming, the users can watch a captured image and operate an interface at the same time, and the capture image as FIG. 4D can be obtained after shooting. Therefore, better shooting experience can be provided via the camera module 41 of the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A driving module, comprising:
   a base;
   a first shiftable plate, wherein a plurality of first rolling members are disposed between the first shiftable plate and the base, so that the first shiftable plate is movable relative to the base along a first direction;
   a second shiftable plate, wherein a plurality of second rolling members are disposed between the second shiftable plate and the first shiftable plate, so that the second shiftable plate is movable relative to the first shiftable plate along a second direction, and the second direction is orthogonal to the first direction; and
   a carrier, wherein a plurality of third rolling members are disposed between the carrier and the second shiftable plate, so that the carrier is movable relative to the second shiftable plate along a third direction, and the third direction is orthogonal to the first direction and the second direction;
   wherein each of the carrier, the first shiftable plate and the second shiftable plate has an opening, and all of the openings are towards the third direction;
   wherein a distance between a center of the opening of the carrier and a center of each of the first rolling members is Dr1, a distance between the center of the opening of the carrier and a center of each of the second rolling members is Dr2, a distance between the center of the opening of the carrier and a center of each of the third rolling members is Dr3, and the following condition is satisfied:

$Dr3<(Dr1+Dr2)/2.$

2. The driving module of claim 1, wherein the first rolling members and the second rolling members are cylinders.

3. The driving module of claim 2, wherein the first rolling members extend along the second direction, and the second rolling members extend along the first direction.

4. The driving module of claim 2, wherein each of a number of the first rolling members and a number of the second rolling members is at least two.

5. The driving module of claim 1, wherein a number of the third rolling members is at least four, and the third rolling members are symmetrically disposed around the center of the opening of the carrier.

6. The driving module of claim 1, further comprising:
   a plurality of first grooves disposed between the base and the first shiftable plate, and the first rolling members disposed in the first grooves.

7. The driving module of claim 1, further comprising:
   a plurality of second grooves disposed between the first shiftable plate and the second shiftable plate, and the second rolling members disposed in the second grooves.

8. The driving module of claim 1, further comprising:
   a plurality of third grooves disposed between the second shiftable plate and the carrier, and the third rolling members disposed in the third grooves.

9. The driving module of claim 1, wherein both of the first shiftable plate and the second shiftable plate are made of plastic material and formed by injection molding.

10. The driving module of claim 9, wherein at least one of the first shiftable plate and the second shiftable plate comprises at least two gate traces.

11. The driving module of claim 9, wherein at least one of the opening of the first shiftable plate and the opening of the second shiftable plate comprises a plurality of strip-shaped wedge structures.

12. The driving module of claim 1, further comprising:
    a first magnet; and
    a second magnet, wherein a polarization direction of the first magnet and a polarization direction of the second magnet are different.

13. The driving module of claim 12, further comprising:
    a first optical image stabilizing coil; and
    a second optical image stabilizing coil;
    wherein the first optical image stabilizing coil and the second optical image stabilizing coil are corresponding to the first magnet and the second magnet, respectively.

14. The driving module of claim 12, further comprising:
    an auto-focusing coil corresponding to one of the first magnet and the second magnet.

15. A camera module, comprising:
    a driving module, comprising:
    a base;
    a first shiftable plate, wherein a plurality of first rolling members are disposed between the first shiftable plate and the base, so that the first shiftable plate is movable relative to the base along a first direction;
    a second shiftable plate, wherein a plurality of second rolling members are disposed between the second shiftable plate and the first shiftable plate, so that the second shiftable plate is movable relative to the first shiftable plate along a second direction, and the second direction is orthogonal to the first direction; and
    a carrier, wherein a plurality of third rolling members are disposed between the carrier and the second shiftable plate, so that the carrier is movable relative to the second shiftable plate along a third direction, and the third direction is orthogonal to the first direction and the second direction;
    an imaging lens element set disposed in the carrier and having an optical axis, wherein the optical axis is parallel to the third direction; and
    an image sensor for converting a light passing through the imaging lens element set into an image signal;
    wherein a distance between a center of an opening of the carrier and a center of each of the first rolling members is Dr1, a distance between the center of the opening of the carrier and a center of each of the second rolling members is Dr2, a distance between the center of the opening of the carrier and a center of each of the third rolling members is Dr3, and the following condition is satisfied:

$$Dr3 < (Dr1 + Dr2)/2.$$

16. An electronic device, comprising:
the camera module of claim 15.

* * * * *